Aug. 17, 1965   G. R. MEADOWCROFT   3,200,574
APPARATUS FOR TRIMMING TREES
Filed Nov. 20, 1961   3 Sheets-Sheet 1
FIG_1
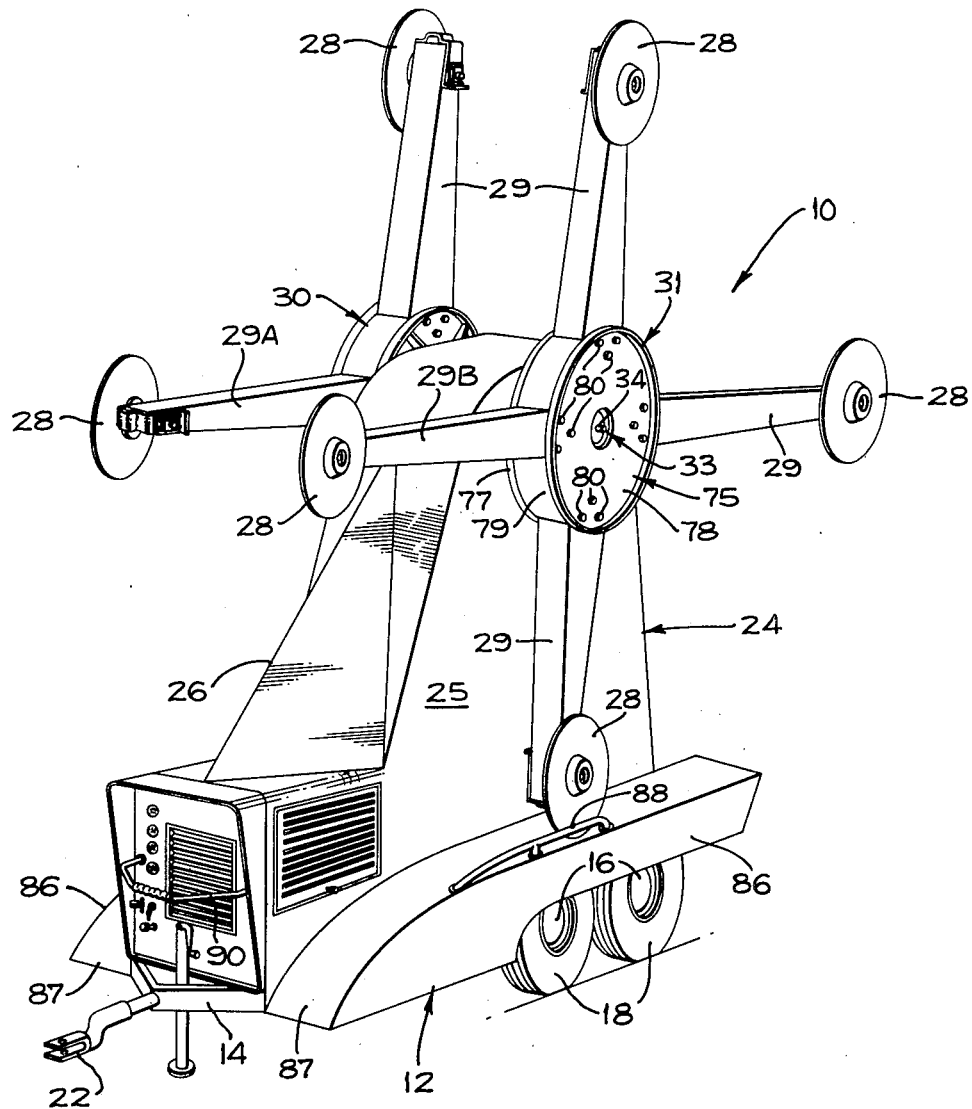
INVENTOR
GEORGE R. MEADOWCROFT
BY *Hans G. Hoffmeister*
ATTORNEY

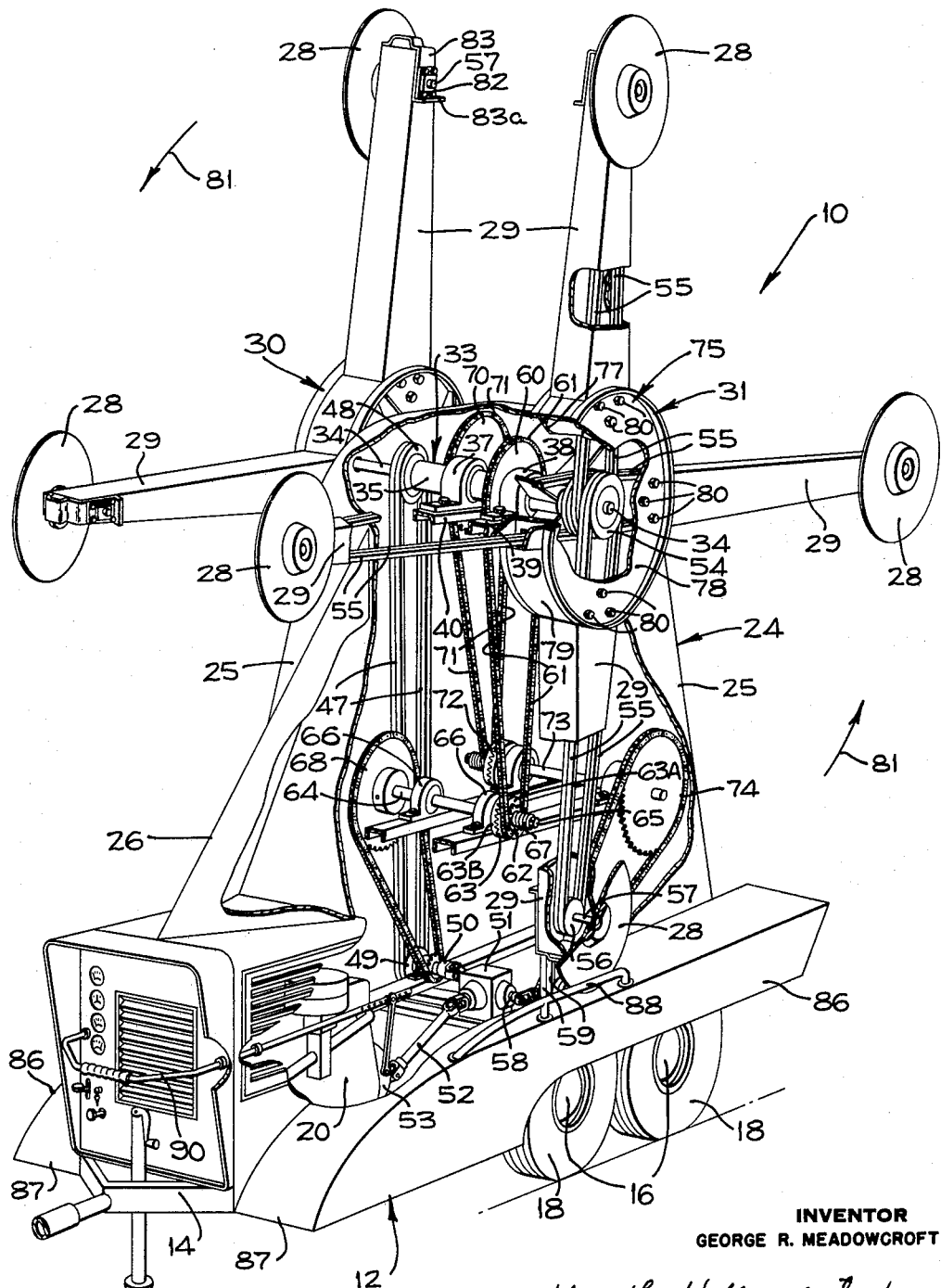

Aug. 17, 1965  G. R. MEADOWCROFT  3,200,574
APPARATUS FOR TRIMMING TREES
Filed Nov. 20, 1961  3 Sheets-Sheet 3
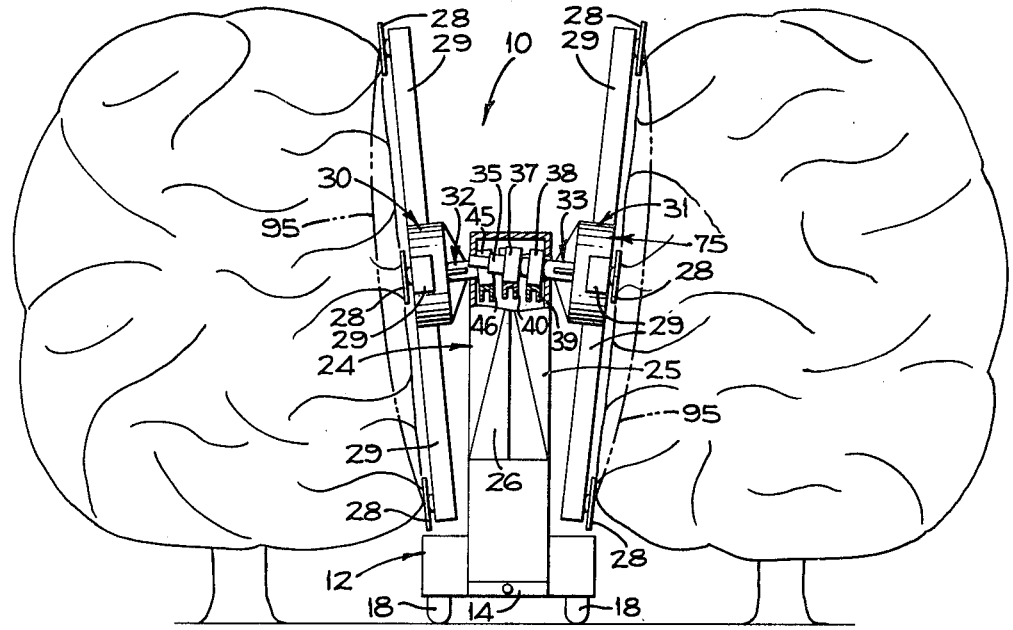
FIG_3
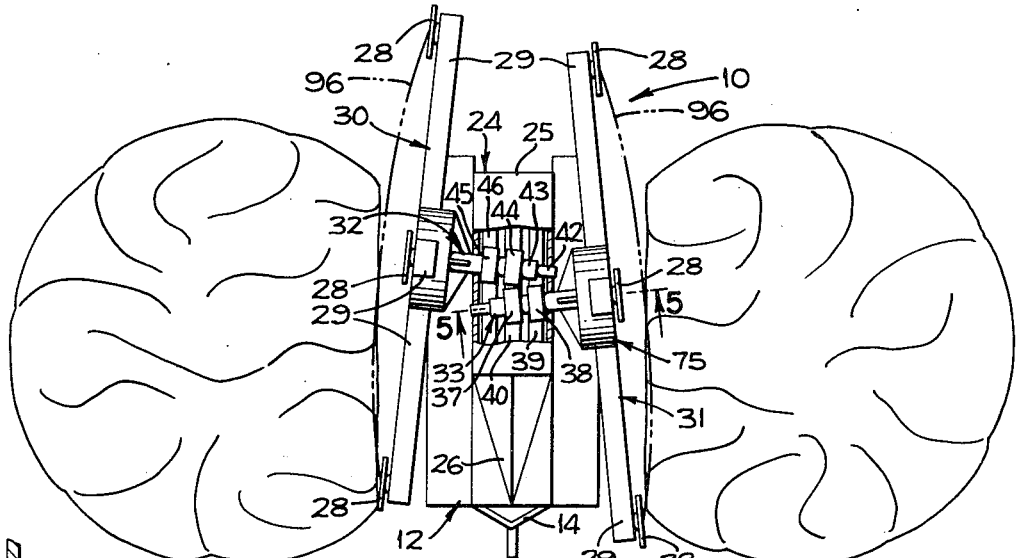
FIG_4
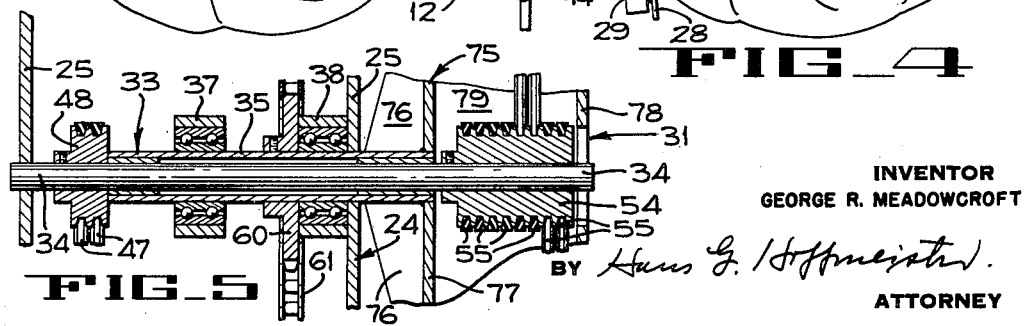
FIG_5
INVENTOR
GEORGE R. MEADOWCROFT
BY Hans G. Hoffmeister
ATTORNEY

United States Patent Office 3,200,574
Patented Aug. 17, 1965

3,200,574
APPARATUS FOR TRIMMING TREES
George R. Meadowcroft, Orlando, Fla., assignor to FMC Corporation, San Jose, Calif., a corporation of Delaware
Filed Nov. 20, 1961, Ser. No. 153,555
5 Claims. (Cl. 56—235)

In orchards having closely spaced trees, it is often necessary to trim the foliage between rows of trees for the purpose of stimulating fruit production by the admission of more sunlight to the interior of the trees and to provide access to the trees for cultivating, spraying, and picking equipment.

Another object of the present invention is to provide a tree trimming machine adapted to trim foliage as it is pulled between rows of trees in an orchard.

Another object of the invention is to provide a machine for cutting a wedge-shaped swath between adjacent rows of trees, the distance between the upper portions of the trimmed trees being greater than the distance between the lower portions.

Another object is to provide an improved drive means for a tree trimming machine.

Another object is to provide an improved carrier for a tree trimming machine.

A further object of the invention is to provide a machine which will deposit the trimmings in windrows adjacent the tree rows.

Other objects and advantages of the invention will be apparent from the following detailed description, reference being made to the annexed drawing, in which:

FIGURE 1 is a perspective of a machine embodying the present invention.

FIGURE 2 is a perspective, similar to FIGURE 1 but having parts broken away and shown in cross-section to show the internal operating linkages.

FIGURE 3 is a diagrammatic front elevation on a reduced scale, partly broken away and partly shown in cross-section, illustrating in an exaggerated manner the vertical inclination of the rotor assembly with respect to trees being trimmed.

FIGURE 4 is a diagrammatic plan of the machine on a reduced scale of FIG. 1 being partly broken away and partly shown in cross-section and illustrating in an exaggerated manner the longitudinal inclination of the rotor assembly with respect to the longitudinal center line of the machine.

FIGURE 5 is an enlarged fragmentary section taken along line 5—5 of FIG. 4.

With reference to the drawings, a tree trimming machine 10, in which one embodiment of the pruning apparatus of the present invention is incorporated, is shown in FIGS. 1 and 2. The machine comprises a chassis 12, which includes a frame 14 supported intermediate its length by tandem axles 16 on which wheels 18 are mounted. A gasoline engine 20 is mounted at the forward portion of the frame 14, and a conventional hitch 22 is provided on the frame adjacent the engine for coupling to the draw bar of a truck or tractor by which the machine is pulled through an orchard.

In order to house and support the operating machinery of the tree hedging or trimming machine 10, a superstructure 24 is mounted on frame 14. The superstructure includes a housing 25 which encloses the drive linkages of the machine and includes a forward portion 26 that is V-shaped and has flat surfaces for directing foliage to the sides of the superstructure and into the path of the cutters of the machine. As the vehicle is moved between adjacent trees, the branches are trimmed by eight circular saws 28 that are mounted at the outer ends of arms 29 of rotor assemblies 30 and 31 which rotate in counterclockwise direction (as viewed in FIGS. 1 and 2). The saws 28 on the arms 29 also rotate counterclockwise about their own axes (as viewed in FIGS. 1 and 2) and move into cutting engagement with the limbs of the tree as they move downwardly toward the position indicated approximately by the position of arms 29A and 29B in FIG. 1. The rotors 30 and 31 are mounted at the left and right side of the upper portion of the superstructure and are driven by composite drive shafts 32 and 33 respectively (FIG. 4).

The composite shaft 33 (FIG. 5) includes a pair of transversely extending, coaxial, telescoping shafts 34 and 35, the outer shaft 35 being mounted in pillow block bearings 37 and 38 supported on longitudinally extending channel members 39 and 40 (FIG. 4) of the frame of the superstructure. Similarly, the composite shaft 32 includes telescoping shafts 42 and 43, with the outer shaft 43 being journalled in spaced pillow bearing blocks 44 and 45. The block 44 is mounted on channel 40 while block 45 is secured to a similar longitudinal channel 46. As seen in FIG. 3, the middle channel 40 is located at a higher elevation than the outer channels 39 and 46. Therefore, the drive shafts are inclined downwardly relative to a horizontal plane at an angle of approximately 3° toward their outer ends. Also, the several pillow blocks are secured to the channels in positions displaced slightly from a position of alignment with the channels and, as a result, the drive shafts are inclined so that their outer ends are displaced rearwardly from a transverse vertical plane that is normal to the longitudinal centerline of the vertical plane that is normal to the longitudinal centerline of the elongate chassis by an angle of approximately 3°.

In each of the composite shafts 32 and 33, the outer shaft is arranged to drive the associated rotor unit 30 or 31 while the inner shaft drives the circular saws 28. The inner drive shafts 34 and 42 are driven in a similar manner, accordingly, a description of the drive for shaft 34 will disclose the drive of shaft 42 also. The shaft 34 is driven by a double belt 47 (FIGS. 2 and 5) that is trained over a sheave 48 keyed to shaft 34 and over a sheave 49 (FIG. 2) secured to a short line shaft 50. The line shaft 50 is coupled to a right angle drive unit 51 by a universal drive connection. An input shaft 52 of unit 51 is connected by a swivel joint to a clutch 53 which is associated with the drive shaft of the engine 20. Accordingly, when the clutch is engaged, the inner shaft 34 is rotated and it, in turn, rotates an eight groove pulley 54 keyed to inner shaft 34. Two grooves of pulley 54 receive a double belt 55 which is also trained around a pulley 56 which is rotatably mounted on a shaft 57 carried at the outer end of each arm 29 of the rotor unit.

As mentioned above, the drive train for the other inner shaft 42 is substantially identical to the drive train of shaft 34 and includes a short line shaft 58 which projects from the right angle drive unit 51, and a double belt 59 trained over a two groove pulley (not shown). With this arrangement, all eight saws 28 are simultaneously rotated when the clutch of the engine is engaged.

The outer shafts 35 and 43 of composite drive shafts 32 and 33 are driven in substantially the same manner and, accordingly, a description of the drive train for shaft 35 will suffice to disclose the drive train of shaft 43 also.

A sprocket 60 (FIG. 5) is keyed to shaft 35 and is arranged to receive a chain 61 that is trained around a lower sprocket 62 that is secured to, or formed integral with one element 63A of a jaw type clutch 63, the element 63A being freely rotatable on a shaft 64 that is keyed to the other element 63B of the clutch and is journalled in fixed bearings 66. A spring 67 disposed around shaft 64 between sprocket 62 and a nut 65 on the shaft provides an overload release which permits the clutch to automatically disengage itself if the saws or rotor assemblies meet abnormal resistance as they move through the branches. The shaft 64 is driven from line shaft 50 by a chain and sprocket drive 68.

As mentioned above, the drive train for the outer shaft 43 is substantially identical to that for shaft 35 and includes a sprocket 70 keyed to shaft 43, a chain 71 trained around sprocket 70, a spring-loaded clutch 72 on a countershaft 73, and a sprocket and chain drive 74 connected through a universal drive to line shaft 58 which projects from the right angle drive unit 51.

The rotor assembly 31 is mounted on the end of outer shaft 35, which projects through the left side of the superstructure 24, and includes a hollow hub 75, which is secured to the periphery of shaft 35 by a plurality of gusset plates 76. The plates 76 extend radially from shaft 35 and are welded to the shaft and to the outer face of one wall 77 of the hub 75 which is provided with an outer wall 78 connected to wall 77 by a peripheral enclosing member 79. The four hollow box-like radial arms 29 are secured to the hub 75 by bolts 80 and project radially outwardly therefrom in equally spaced relationship. Accordingly, when shaft 35 is rotated the entire rotor assembly 31 rotates about the axis of shaft 34. Similarly, the rotor assembly 30 is secured to outer shaft 43 and rotates about the axis of shaft 42 when it is rotated. As previously mentioned, the drive trains are so arranged that the rotor assemblies 30 and 31 are rotated counterclockwise as indicated by arrows 81 (FIG. 2) and the saws 28 and also rotated counterclockwise about their own axis.

In order to tighten the drive belts 55 of the saws 28, the shafts 57 may be mounted in bearings 82 that are adjustably connected to the associated arm 29, one on each side thereof. To provide this adjustment, a bracket 83 is mounted in fixed position on the end of each arm 29. A screw (not shown) is threaded through a lower flange 83a extending from each side of bracket 83, and bears against the lower side of the adjacent bearing. The bracket and the arm 29 has slots (not shown) in each side face to permit the shaft 57 and bolts, which hold the bearing in position on the arm, to be shifted relative to the arm 29 when the bolts are loosened.

Each rotor assembly may be adjusted laterally relative to the superstructure to permit the machine to cut swaths of various widths. The hedging width adjustment is made by sliding the outer shaft of each composite shaft 32 and 33 within the confines of the associated stationary pillow block bearings 37 and 38 or 44 and 45. The innermost adjusted position of the rotor 31 is shown in FIG. 5. To shift the rotor outwardly, to the right in FIG. 5, the pulley 48, is disconnected from shaft 34 and sprocket 60 is disconnected from shaft 35. The shafts 34 and 35 may then be slid relative to the pillow bearings 37 and 38 which are of a commercial type that will permit this shifting of the shaft.

In order to permit the tree hedging machine to be transported in an assembled condition along a highway, it may be necessary to reduce the length of the uppermost radial arm 29. One radial arm of each rotor assembly may, therefore, be provided with a hinged joint and a latch to permit that arm to be folded down for highway travel clearance. The joint and latch for connecting the two sheet metal housing sections may be of the type disclosed in the pending application of Nottingham, Ser. No. 91,015, now Patent No. 3,088,676 which is assigned to the assignee of the present invention, and reference may be had to said application for a detailed description of these devices.

In accordance with this invention, means are provided for directing cut limbs and branches into position for a secondary cutting. A sheet metal guard 86 covers the dual wheels at each side of the machine, and a sloping forward nose portion 87 of each guard 86 guides foliage so that it moves upwardly along the guard toward the path of the saws 28 which sweep downwardly and rearwardly along a path close to the upper surface of the guard. This foliage is elevated by the nose portion 87 and is further lifted into the cutting path of the saws sweeping over the guard 86 by a rail assembly 88, which is fixed on the upper surface of the guard.

In operation, the tree hedging machine is coupled to a truck or tractor and aligned between tree rows in an orchard. The engine 20 is started and the operator pulls a U-shaped clutch operating bar 90 that is mounted on the front of the machine. This engages the clutch and connects the engine 20 in driving relationship with the several above described drive trains whereby the rotors and saws are operated. Since the leading radial arms and saw blades descend on the limbs, there is little tendency for the limbs to pinch the saw blades and stall them. However, if stalling does occur, the jaw clutches 63 and 72 will disengage the drives until the overload condition can be corrected.

An important feature of the tree hedging machine 10 is the inclination of the rotor assemblies 30 and 31 which is attained by angling the outer ends of the rotor mounting shafts downwardly and rearwardly, as was previously mentioned. This enables a wedge-shaped swath to be cut as described, and causes only the descending radial arms and saw blades to cut the foliage. As the saw blades are carried rearwardly by the radial arms, their paths converge toward the longitudinal center line of the machine and thus prevent any secondary cutting action by the ascending saw blades upon the trees already trimmed.

In FIGURE 3, the rotors 30 and 31 are shown with their shafts tilted downwardly only while in FIGURE 4 the shafts are angled rearwardly only. Accordingly, the true path of the saws cannot be determined from these views. Actually, with a rotor diameter in the range of from 14–18 feet and a 3° inclination of each shaft downwardly and rearwardly, the saws travel along a path that is somewhat convex, as indicated by phantom lines 95 and 96 in FIGS. 3 and 4 respectively. With such an arrangement, each cutter moves into engagement with branches after it passes upper dead center and continues cutting as it moves downwardly along path 95. During its rearward movement, it moves away from the tree and, during upward movement, it approaches the tree preparatory to again move into cutting engagement.

Since the cutting occurs directly over the rounded nose 87 of the guard 86 at each side of the machine, a large portion of the cut limbs and branches fall onto the guard. The cut branches move along the upper surface of the guard 86 and into the cutting area of the saw blades 28 sweeping over the guard. In this manner a secondary cutting action is obtained and the trimmed twigs and limbs fall from the rear edge of the guard 86 in neat windrows.

It is evident of course that the trimming may be done in an orchard by moving longitudinally of the orchard to trim the trees on each side of all the longitudinal rows, and then moving transversely of the field to trim the trees on each side of all the transverse rows. When this type of operation is completed, all four sides of each tree will have been trimmed and, as a result, sunlight can reach the lower branches on all sides of each tree.

While a particular embodiment of the present invention has been shown and described, it will be understood that the tree hedging machine is capable of modification and variation without departing from the principles of the invention and that the scope of the invention should be limited only by the scope and proper interpretation of the claims appended hereto.

Having thus described my invention what I claim as new and desire to protect by Letters Patent is:

1. A tree hedging machine comprising a chassis adapted for movement in a forward longitudinal direction along the ground between rows of trees, a superstructure mounted on said chassis, rotatable drive shafts projecting from opposite sides of said superstructure with both a downward inclination and a rearward inclination with respect to said direction, means mounting said drive shafts for adjustable movement toward and away from the longitudinal center plane of said superstructure, first driving means for rotating said drive shafts, a rotor mounted on each drive shaft for rotary movement in planes converging rearwardly and downwardly on each side of said superstructure, each rotor including a plurality of radially extending arms equiannularly spaced, a circular cutting blade mounted for rotation on the end of each arm, and second independent driving means operatively arranged to effect rotation of said blades in the same direction of rotation as said rotor.

2. A tree trimming machine comprising a chassis having a forward and a rearward end adapted to be propelled in a forward longitudinal direction between rows of trees in an orchard, a superstructure mounted on said chassis, a pair of rotatable drive shafts mounted to project transversely outward from said superstructure from each side thereof with both a downward inclination and a rearward inclination with respect to said direction, at least one of said shafts being provided with means for adjusting said shaft for movement toward and away from the longitudinal center plane of said superstructure, a rotor centrally mounted on each of said shafts, each rotor including a plurality of equiannularly spaced radially extending arms extending from the central portion thereof, circular saws rotatably mounted at the outer ends of said arms, means for driving said drive shafts whereby said arms move downwardly at the forward end of said chassis as said rotors rotate, independent means for driving said saws in the same direction of rotation as said rotors, and guide means on each side of said chassis positioned below said rotors and adapted to receive trimmings cut by said saws and direct said trimmings back toward the rearward end of said chassis and into the path of said saws.

3. A tree hedging machine comprising a chassis adapted to be propelled in a forward longitudinal direction between rows of trees in an orchard, superstructure mounted on said chassis, a pair of composite driveshafts, each shaft being mounted on an opposite side of said superstructure and including relatively rotatable coaxial inner and outer members transversely positioned on said superstructure and projecting outwardly therefrom at a downward inclination and a rearward inclination with respect to said direction of movement of said machine, means for adjustably mounting at least one of said driveshafts for adjustable movement transversely of said superstructure, first drive means for driving said outer drive members, a rotor mounted on each of said outer drive members, each rotor including a plurality of equiannularly spaced radial arms, circular saws rotatably mounted at the outer ends of said arms, second drive means including a belt and pulley drive for rotating each of said inner drive members, and means connecting each inner drive member to the plurality of said saws mounted upon its associated rotor for rotating said saws in the same direction of rotation as said rotor.

4. A tree trimming apparatus comprising a chassis having a forward and a rearward end and being adapted for movement in a forward longitudinal direction along the ground, a superstructure mounted on said chassis, a rotatable drive shaft transversely positioned on said structure projecting outwardly therefrom with both downward inclination and rearward inclination with respect to said direction, first drive means for driving said drive shaft, a plurality of circular cutting blades, a rotor coupled for rotation with said drive shaft and rigidly supporting said circular blades in equiannularly spaced relationship about the axis of said drive shaft, and second independent driving means operatively arranged to effect rotation of said circular cutting blades, said first driving means driving said rotor to rotate the circular blades downwardly at said forward end of the chassis, said second driving means rotating said blades in the same direction of rotation as said rotor.

5. A tree trimming machine comprising an elongate support structure having a forward and a rearward end, an axle extending transversely of said structure, a pair of wheels on said axle for supporting said structure and adapting said structure for movement in a longitudinal forward direction, a composite drive shaft mounted in an elevated position on said structure, said shaft including an inner drive member and an outer tubular drive member rotatably mounted upon the inner member, said shaft extending in a direction generally transverse of said structure but being slightly inclined downwardly relative to a horizontal plane and slightly inclined rearwardly relative to said forward end of said structure, a rotor fixed at its central portion to one of said drive members and having a plurality of equiannularly spaced radially extending arms projecting from said central portion and disposed alongside a side portion of said structure, a rotary saw rotatably mounted adjacent the outer end of each arm, means connecting each saw to the other of said drive members, first drive means for rotating said one of said drive members to rotate said rotor in a direction whereby said saws move downwardly at said forward end of the structure, and second means for independently rotating the other of said drive means to rotate said saws in the same direction of rotation as said rotor.

References Cited by the Examiner

UNITED STATES PATENTS

| 381,508 | 4/88 | Oliver | 56—235 |
| 2,926,480 | 3/60 | Kimball | 56—235 |

FOREIGN PATENTS

| 190,720 | 5/88 | France. |
| 368,689 | 8/06 | France. |

OTHER REFERENCES

"The California Citrograph," pages 44 and 52, December 1957, Vol. 42, No. 2.

T. GRAHAM CRAVER, *Primary Examiner.*

CARL W. ROBINSON, ARNOLD RUEGG, *Examiners.*